United States Patent

[11] 3,599,933

| [72] | Inventor | Jack E. Piccardo<br>Oakland, Calif. |
|---|---|---|
| [21] | Appl. No. | 8,840 |
| [22] | Filed | Feb. 5, 1970 |
| [45] | Patented | Aug. 17, 1971 |
| [73] | Assignee | Grove Valve and Regulator Company<br>Oakland, Calif. |

[54] ROTARY VALVE BEARING ASSEMBLY
10 Claims, 9 Drawing Figs.

[52] U.S. Cl. .................................................... 251/309,
251/174
[51] Int. Cl. .................................................... F16k 5/06
[50] Field of Search .......................................... 251/315,
148, 151, 152, 174, 309; 137/454.2

[56] References Cited
UNITED STATES PATENTS

| 2,034,216 | 3/1936 | Stout et al. | 251/175 X |
| 3,272,473 | 9/1966 | Veit et al. | 251/315 X |
| 3,277,919 | 10/1966 | Piccardo | 251/315 X |
| 3,398,925 | 8/1968 | Scaramucci | 251/315 X |
| 3,497,178 | 2/1970 | Priese | 251/174 |

*Primary Examiner*—M. Cary Nelson
*Assistant Examiner*—Michael O. Sturm
*Attorney*—Melvin R. Stidham

ABSTRACT: A valve structure comprising a rotatable valve member with a pair of coaxial trunnions extending therefrom. Bearing blocks are received on the trunnions and the entire assembly may be inserted into a tubular valve body. A radial flange extends from one end of each bearing block to be clamped firmly between an internal shoulder in the body tube and the adjacent valve end closure.

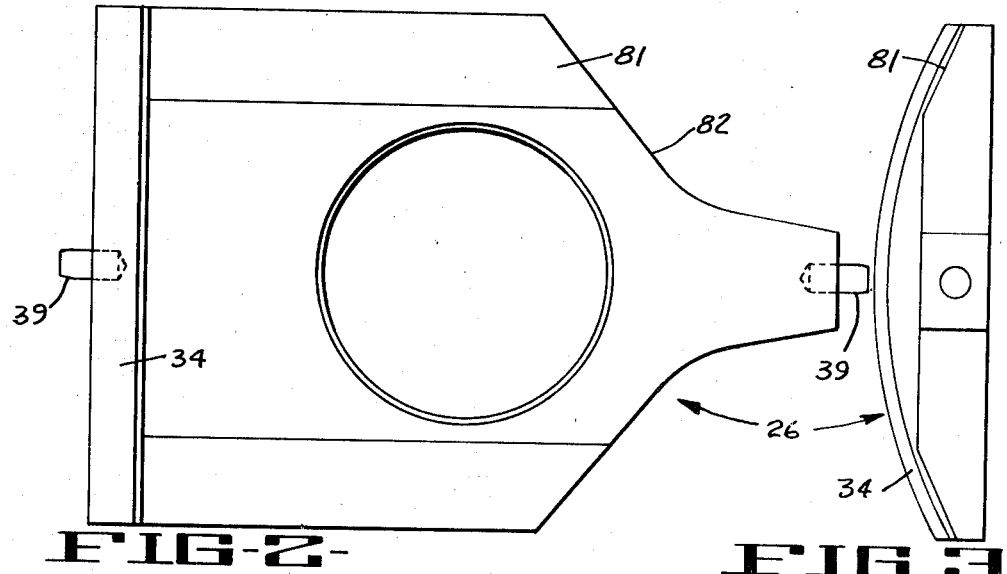
FIG-2-  FIG 3
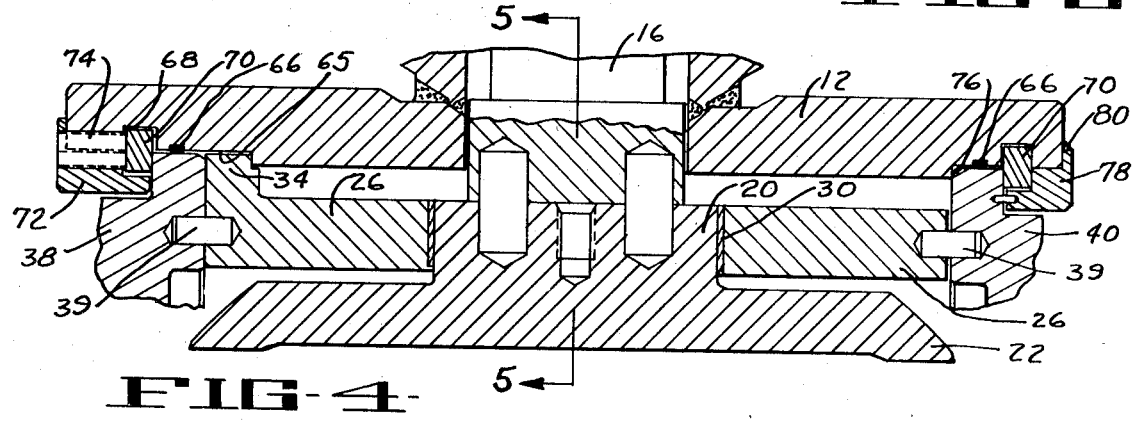
FIG-4-
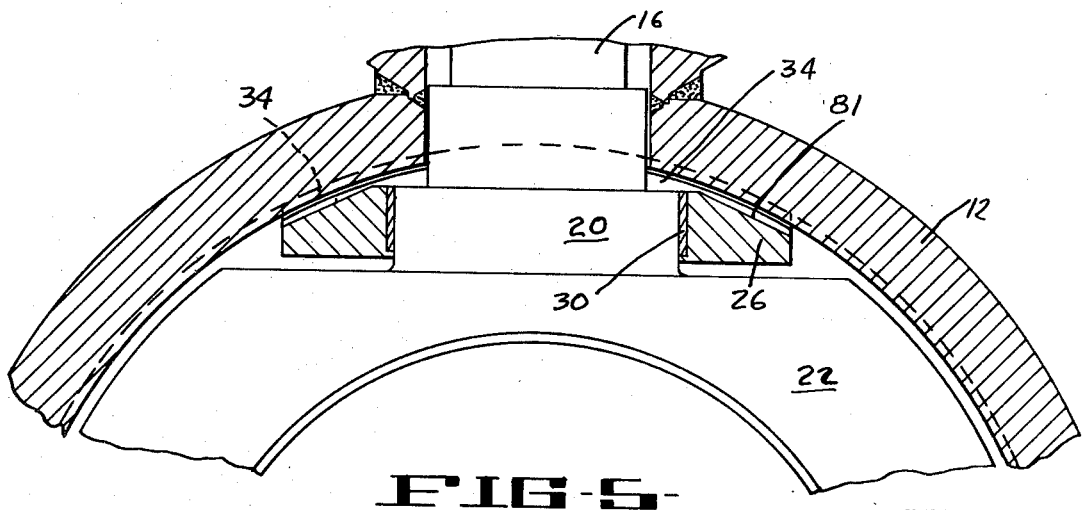
FIG-5-
INVENTOR.
JACK E. PICCARDO
ATTORNEY

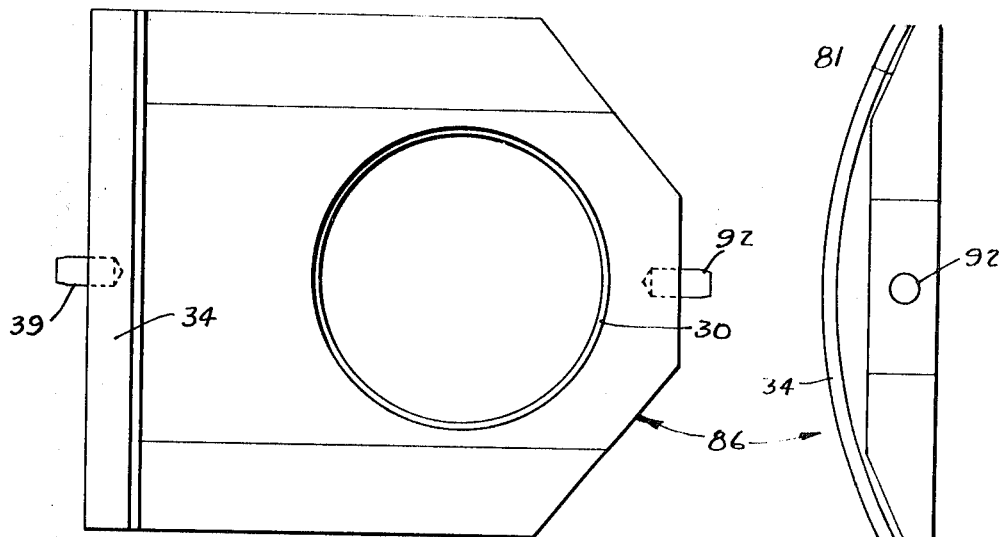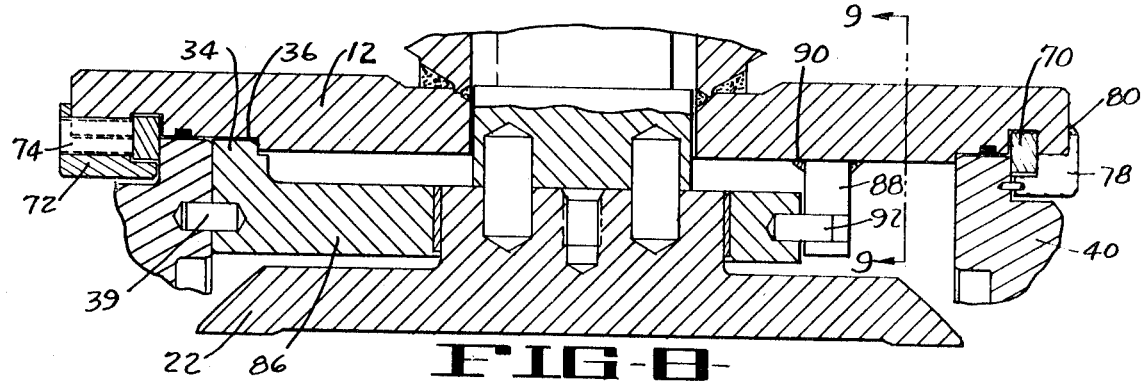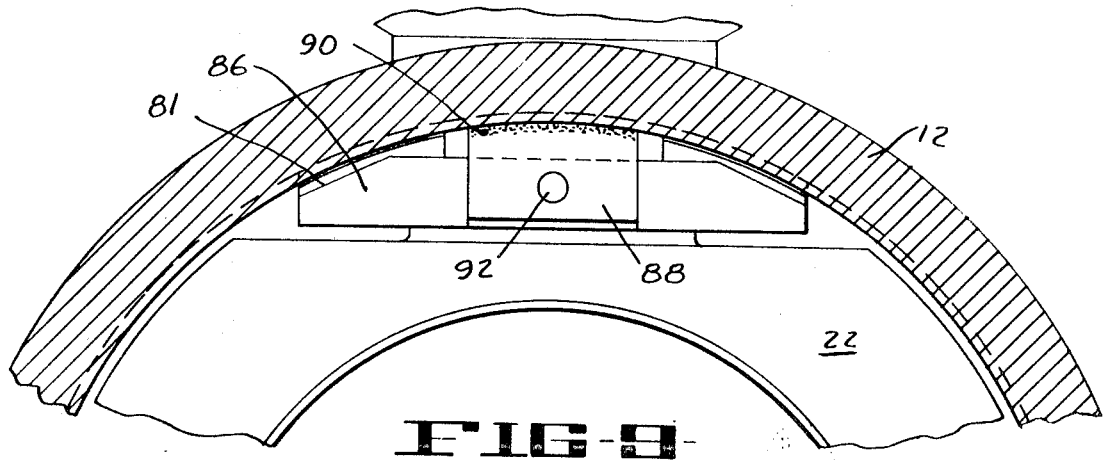

ROTARY VALVE BEARING ASSEMBLY

BACKGROUND OF THE INVENTION

It was previously deemed desirable to fabricate ball valves, or the like, of bolted construction with end closures bolted to a tubular body member. Such a construction is shown in U.S. Pat. No. 3,348,804 granted to Jack E. Piccardo on Oct. 24, 2967, and comprises end closure plates which are bolted to a tubular body member. With one end plate removed, the valve ball with bearing blocks carried on its trunnions is inserted into the body. Then when the closure plate is bolted into place the distance between end closure plates is such that the bearing blocks are clamped between them.

While the fabricated ball valve of the Piccardo U.S. Pat. No. 3,348,804 has been highly successful in performance, manufacturing costs have been governed to some extent by the close machining tolerances required for valve components of considerable dimension, i.e. the full length of the valve body, in order to achieve the desired clamping action.

OBJECTS OF THE INVENTION

It is an object of this invention to provide a fabricated rotatable valve having removable valve member and bearings, with greatly simplified means for clamping the bearings in place.

It is a further object of this invention to provide clamped bearing blocks which may easily be manufactured within desired tolerances.

It is a further object of this invention to provide a rotatable valve member with clamped bearing blocks of minimal dimension to enable reduced manufacturing cost.

It is a further object of this invention to provide a rotatable valve member with bearing block clamped at just one end.

It is a further object of this invention to provide a rotatable valve with clamped bearing block wherein the machining tolerances to achieve the clamping action are for components of relatively small dimension.

It is a further object of this invention to provide a rotatable valve member with bearing blocks clamped on one end wherein the closure on the opposite end may be removed without disturbing the internal components.

Further objects and advantages of this invention will become apparent from the description to follow when read in conjunction with the accompanying drawings.

BRIEF DESCRIPTION OF THE INVENTION

In the preferred embodiments of this invention a rotatable valve member, such as a ball, may be inserted together with bearing blocks carried on its trunnions, into one end of a valve housing with an end closure removed. The bearing blocks have radial flanges on one end which seat against an internal shoulder in the housing. Positioning means, such as pins, engage between the housing and bearing block to define the proper positions of the bearing blocks. Then, when the end closure bolts are tightened, the end closure clamps the bearing block flanges firmly against the internal shoulder in the housing to fix the bearing blocks in proper disposition.

BRIEF DESCRIPTION OF THE DRAWINGS

FIG. 2 is a top view of a bearing block comprising a feature of this invention;

FIG. 3 is an end view of the bearing block;

FIG. 4 is an enlarged partial section view showing the bearing block assembly and positioning means;

FIG. 5 is a section view taken along line 5-5 of FIG. 4;

FIG. 6 is a top view of a modified form of bearing block;

FIG. 7 is an end view of the baring block of FIG. 6;

FIG. 8 is a partial section view showing the modified bearing block assembly; and FIG. 9 is a section taken along line 9-9 of FIG. 8.

DESCRIPTION OF THE PREFERRED EMBODIMENTS

The Embodiments of FIGS. 1—5

Figure 1:
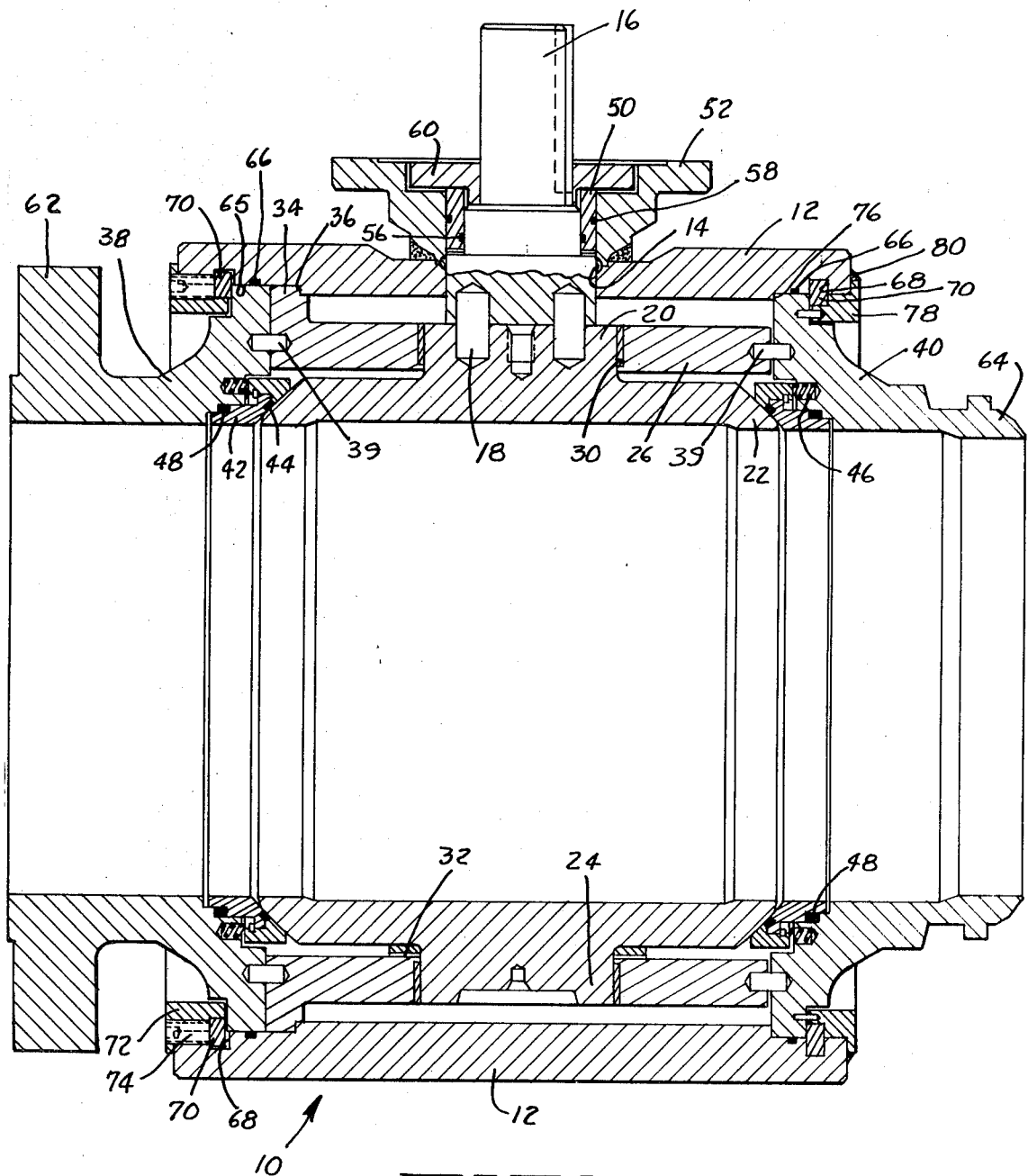
FIG. 1 is a vertical section view of a ball valve embodying features of this invention.

Referring more particularly to FIG. 1, the ball valve 10 of this invention includes a generally cylindrical main body tube 12 which is bored at the top 14 to receive a valve stem 16 which, in turn, is releasably connected as by means of suitable pins 18 to the upper trunnion 20 of a valve ball. The upper and lower trunnions 20 and 24 of the ball are rotatably carried in upper and lower bearing blocks 26 with a suitable bushing 30 being provided to facilitate rotation thereof. A thrust bearing 32 is provided on the lower bearing block to carry the weight of the ball. The bearing blocks 26 are held securely in place by firmly clamping a flange 34 at one end of the bearing block between between an internal shoulder 36 in the main body tube 12 and one of the end valve closures 38, as will hereinafter be described in detail. Pins 39 are provided to define the proper disposition of the bearing blocks. The end closures 38 and 40 are, in turn, firmly secured within the main body tube 12 by suitable means to be described. Seat ring assemblies 42 which may contain a suitable resilient seal such as on O-ring 44 are provided to seal on both the upstream and downstream sides of the valve ball 22 with initial sealing engagement being provided by a plurality of coil springs 46 which bias them toward the ball. An O-ring 48 is provided around each seat ring assembly 42 to seal between them and the valve closure 38,40.

The structure thus far described lends itself readily to fabrication in that, with one end closure 38 removed, the bearing blocks may be placed on the upper and lower trunnions and the entire assembly inserted into the main body tube 12. Then, the stem 16 is inserted through the top bore 14 and interlocked at 18 with the upper trunnion 20. Then a gland 50 is inserted into an adapter member 52 for an automatic operation (not shown) and secured in place. The gland 50 carries suitable seals, such as O-rings 56, to seal around the stem, and a larger O-ring 58 seals between the gland 50 and the adapter plate 52. A stop plate 60, which is keyed or otherwise secured to the stem 16, defines the open and closed positions of the valve ball 22. When the end closure with seat ring assembly 42 included in inserted into the main body tube 12 and secured in place, the assembly is complete. The end closures may be formed to terminate in flange ends 62 or weld ends 64 or, as shown, both.

Again, as shown more clearly in FIGS. 2 through 5, the bearing blocks 26 have an outer flange 34 at one end thereof which engages an internal shoulder 36 in the main body tube 12 formed by the terminus of a large diameter bore 65 that receives the end closure plate 38. A groove is cut around the bore 65 to form a recess for an O-ring 66 which seals the closure joint. A segmented thrust ring 70 is carried in a recess 68 in the main body tube 12, and interposed between it and the end closure 38 is a retainer ring 72. The retainer ring is secured to the main body tube 12 by a plurality of shear screws 74 which are threaded into tapped openings centered on the annular crack between the retainer ring 72 and the end of the body tube 12. Thus, the screws are threaded jointly into the two members. The thrust ring is particularly adapted to withstand test pressures of twice the working pressure or more and, after testing, the screws 74 may be tightened to force the thrust ring 70 and the end closure to clamp the bearing block flange 34 firmly between the end closure 38 and the internal shoulder 36 on the main body tube 12.

Since it is necessary to remove only one end closure 38 in order to service the valve interior, the opposite end closure 40 need not be of bolted construction. Hence, the end closure 40 is seated against an internal shoulder 76 with an O-ring 66 sealing the joint. A similar segmented thrust ring 70 is carried in a recess 68 to hold the end closure against internal pressures and a retainer ring 78 is tack welded at 80 to the body tube to hold the thrust ring 70 in place.

Thus, in assembly, the ball 22 with bearing blocks 26 mounted on the trunnions 20 and 24 is inserted through the bore 65 until the pins 39 are inserted into complementary holes in the opposite end closure 40. Then, the end closure is placed in the bore 65 so that the positioning holes therein engage the pins 39 at that end. This determines the proper positions of the bearing blocks. Referring to FIGS. 3 and 5, it will be noted that the bearing blocks 26 are relieved at 81 so that they will fit within the body tube 12 and the radial flange 34 conforms to the curvature of the bore 65. Hence, when the screws 74 are tightened firmly against the thrust ring 70 the end closure clamps the bearing block flanges firmly against the shoulder 36.

Virtually all of the load on the bearing blocks is taken by the clamped flanges 34 and the pins 39 at the opposite end merely hold the blocks for proper alignment. Therefore, as shown in FIG. 2, the opposite ends may be greatly relieved at 82 for considerable saving of material. Moreover, the opposite end closure 40 may be removed to service the seat ring at that side without removing the ball or other internal components.

The Embodiments of FIGS. 6—9

Referring now to FIGS. 6 through 9, another form of bearing block 86 is provided which, as shown, may be of much shorter length because it does not have to extend to engage with the opposing end closure. Instead, an anchor block 88 is secured within the body tube 12 as by welding it at 90 in a location spaced from the end closure 40. Then, the bearing block 86 is located by insertion of a pin 92 through hole bored in the anchor block 88. After the bearing block flange 34 is clamped as previously described, the pin 92 helps to maintain alignment and, at the bottom helps support the ball.

While this invention has been described in conjunction with preferred embodiments thereof, it is obvious that modifications and changes therein may be made by those skilled in the art without departing from the spirit and scope of this invention.

What is claimed is:

1. A valve structure comprising:
 a main body member,
 a rotatable valve member in said main body member,
 a pair of trunnions extending from said valve member,
 a pair of bearing blocks rotatably receiving said trunnions,
 a flange carried on one end of each of said bearing blocks,
 a closure with a flow passageway therethrough secured on one end of said main body member, and
 an internal shoulder in said main body member around said one end inward of said closure,
 said flanges being clamped between said closure and said internal shoulder.

2. The valve structure defined by claim 1 including:
 means holding the other ends of said bearing blocks against movement in said body member.

3. The valve structure defined by claim 2 wherein said holding means comprises:
 opposed sockets in said other end of said body, and pins engaged in said opposed sockets.

4. The valve structure defined by claim 2 wherein said holding means comprises:
 anchor blocks secured in said body, and
 pins interlocking said other ends of the bearing blocks and said anchor blocks.

5. The valve structure defined by claim 1 wherein:
 said closure fits within said one end of said main body member, and including:
 a thrust ring received in said one end outward of said closure and
 screw means in said body member forcing said thrust ring against said end closure.

6. The valve structure defined by claim 5 including:
 a retainer ring received in one end,
 a plurality of tapped holes around the juncture between said main body member and said retainer ring, and
 said screw means are threadedly received in said tapped holes.

7. The valve structure defined by claim 6 including:
 a radial flange around said retainer ring engaging the outer face of said main body member,
 said flange being of sufficient width that the full diameter of said tapped holes is contained in the outer face of said retainer ring.

8. The valve structure defined by claim 5 including:
 a groove around the inside of said main body member outward of said closure,
 said thrust ring comprising:
 a segmented ring received in said groove and extending radially inward therefrom to lock said closure against outward displacement, and
 means received within said segmented ring to provide radial displacement thereof.

9. The valve structure defined by claim 8 wherein:
 the outer face of said segmented ring is of sufficient width to accommodate the inner ends of said shear screws bearing against it.

10. The valve structure defined by claim 5 including:
 a recess around said main body member outward of said closure,
 said thrust ring comprising a segmented ring in said recess, and
 a plurality of screws in said main body member bearing against said thrust ring to bias it axially inward against said closure.